(12) United States Patent
Allard

(10) Patent No.: US 12,146,566 B1
(45) Date of Patent: Nov. 19, 2024

(54) GRADE BASED TRANSMISSION PARK PAWL UNLOADING VIA CLUTCH ACTIVATION

(71) Applicant: FCA US LLC, Auburn Hills, MI (US)

(72) Inventor: Corey Allard, Fenton, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/493,913

(22) Filed: Oct. 25, 2023

(51) Int. Cl.
| | | |
|---|---|---|
| F16H 61/04 | (2006.01) | |
| F16H 59/52 | (2006.01) | |
| F16H 59/66 | (2006.01) | |

(52) U.S. Cl.
CPC ............. *F16H 61/04* (2013.01); *F16H 59/52* (2013.01); *F16H 59/66* (2013.01); *F16H 2059/663* (2013.01)

(58) Field of Classification Search
CPC .... F16H 59/52; F16H 59/66; F16H 2059/663; F16H 61/04; F16H 2061/0241
See application file for complete search history.

(56) References Cited

U.S. PATENT DOCUMENTS

| | | | |
|---|---|---|---|
| 5,807,205 A * | 9/1998 | Odaka | F16H 63/483 477/901 |
| 9,809,205 B2 | 11/2017 | Förster et al. | |
| 9,994,098 B2 | 6/2018 | Ai et al. | |
| 10,053,098 B2 | 8/2018 | Feiner et al. | |
| 10,899,335 B2 | 1/2021 | Ruybal et al. | |
| 11,215,245 B2 | 1/2022 | Kimes et al. | |
| 11,407,388 B2 * | 8/2022 | Hollowell | F16H 63/3483 |
| 2008/0051252 A1 * | 2/2008 | Nishimura | B60T 1/005 477/92 |
| 2013/0225363 A1 | 8/2013 | Lehmen et al. | |
| 2013/0305863 A1 * | 11/2013 | Weslati | F16H 63/48 74/411.5 |

\* cited by examiner

*Primary Examiner* — Edwin A Young
(74) *Attorney, Agent, or Firm* — Jeremy J. Klobucar

(57) ABSTRACT

Grade based transmission park pawl unloading techniques include in response to detecting a request to shift a transmission of a vehicle out of a park state, determining a set of load parameters using a set of sensors configured to monitor the set of load parameters of the vehicle, the set of load parameters including at least a grade of a surface that the vehicle is on and a weight of the vehicle, based on the set of load parameters, activating a series of a plurality of clutches of the transmission to cause the transmission to transfer or output a desired amount of drive torque in a desired direction to unload the park pawl, and when the park pawl is unloaded, shifting the transmission out of the park state without any noise/vibration/harshness (NVH) associated with the previous loading of the park pawl.

14 Claims, 2 Drawing Sheets

GRADE BASED TRANSMISSION PARK PAWL UNLOADING VIA CLUTCH ACTIVATION

FIELD

The present application generally relates to vehicle park control systems and, more particularly, to techniques for unloading a transmission park pawl via grade based clutch activation.

BACKGROUND

A park pawl is engaged when a customer moves a transmission shift lever to a park position. When engaged, the park pawl physically locks up the transmission to prevent vehicle movement. More specifically, a pin or tooth of the park pawl physically engages a notched wheel (e.g., another tooth of a park gear) on an output shaft of the transmission. When the vehicle is parked, the vehicle can slightly roll thereafter and load the park pawl (i.e., the vehicle settles with its weight on the park pawl). This is particularly true when the vehicle is parked on a grade. If unaccounted for, this typically results in a noticeable "bump" (noise/vibration/harshness, or NVH) when the driver shifts out of park. One potential solution to this problem could be to use an electronic park brake, but this requires an interaction between with a brake/electronic park brake module and is often a selectable driver option that requires manual driver activation. Accordingly, while such conventional vehicle park control systems do work well for their intended purpose, there exists an opportunity for improvement in the relevant art.

SUMMARY

According to one example aspect of the invention, a park control system for grade based transmission park pawl unloading of a vehicle is presented. In one exemplary implementation, the park control system comprises a set of sensors configured to monitor a set of load parameters of the vehicle, the set of load parameters including at least a grade of a surface that the vehicle is on and a weight of the vehicle, and a controller configured to detect a request to shift a transmission of the vehicle out of a park state where a park pawl is engaged with an output shaft of the transmission to inhibit or prevent vehicle movement, in response to detecting the request, determine the set of load parameters using the set of sensors, based on the set of load parameters, activate a series of a plurality of clutches of the transmission to cause the transmission to transfer or output a desired amount of drive torque in a desired direction to unload the park pawl, and when the park pawl is unloaded, shift the transmission out of the park state without any noticeable noise/vibration/harshness (NVH) associated with the previous loading of the park pawl due to the surface grade and the vehicle weight.

In some implementations, an electronic park brake is not utilized when shifting the transmission into the park state on the graded surface. In some implementations, the electronic park brake is not utilized when unloading the park pawl and shifting the transmission out of the park state. In some implementations, the controller is a transmission control module (TCM) configured for dedicated control of the transmission.

In some implementations, the transmission is a multi-speed automatic transmission comprising the plurality of clutches and a plurality of gears. In some implementations, the controller knows the configuration of the transmission such that it is able to activate a plurality of different series of the plurality of clutches to cause the transmission to transfer or output a plurality of different amounts of drive torque in both forward and reverse directions. In some implementations, the activation of at least some of the plurality of clutches comprises only partial engagement of the clutches.

According to another example aspect of the invention, a grade based transmission park pawl unloading method for a vehicle is presented. In one exemplary implementation, the method comprises detecting, by a controller, a request to shift a transmission of the vehicle out of a park state where a park pawl is engaged with an output shaft of the transmission to inhibit or prevent vehicle movement, in response to detecting the request, determining, by the controller, a set of load parameters using a set of sensors configured to monitor the set of load parameters of the vehicle, the set of load parameters including at least a grade of a surface that the vehicle is on and a weight of the vehicle, based on the set of load parameters, activating, by the controller, a series of a plurality of clutches of the transmission to cause the transmission to transfer or output a desired amount of drive torque in a desired direction to unload the park pawl, and when the park pawl is unloaded, shifting, by the controller, the transmission out of the park state without any noticeable NVH associated with the previous loading of the park pawl due to the surface grade and the vehicle weight.

In some implementations, an electronic park brake is not utilized when shifting the transmission into the park state on the graded surface. In some implementations, the electronic park brake is not utilized when unloading the park pawl and shifting the transmission out of the park state. In some implementations, the controller is a TCM configured for dedicated control of the transmission.

In some implementations, the transmission is a multi-speed automatic transmission comprising the plurality of clutches and a plurality of gears. In some implementations, the controller knows the configuration of the transmission such that it is able to activate a plurality of different series of the plurality of clutches to cause the transmission to transfer or output a plurality of different amounts of drive torque in both forward and reverse directions. In some implementations, the activation of at least some of the plurality of clutches comprises only partial engagement of the clutches.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, conventional vehicle park control systems often experience a noticeable "bump" (noise/vibration/harshness, or NVH) when the vehicle is parked on a hill and the park pawl is subsequently loaded by the vehicle weight and thereafter shifted out of park. One possible solution to this problem could be to use an electronic park brake, but this requires an interaction between a brake/electronic park module and is often a selectable option that requires manual driver activation.

As a result, the present application is directed to improved grade based transmission park pawl unloading techniques that do not require an electronic park brake. These techniques control the activation of one or more clutches of an automatic transmission to generate a small amount of propulsive torque in a direction opposite of the grade (e.g., forward when the vehicle is parked facing uphill, or reverse when the vehicle is parked facing downhill). The vehicle is able to determine a desired amount of propulsive torque based on the grade/slope and its mass, which is already known and provided to the transmission (i.e., the TCM) for shift scheduling activities. Based on the desired amount of propulsive torque, the TCM determines a series of clutches of the automatic transmission to temporarily apply until the vehicle is shifted out of park without the above-described noticeable "bump" or NVH.

Figure 1:
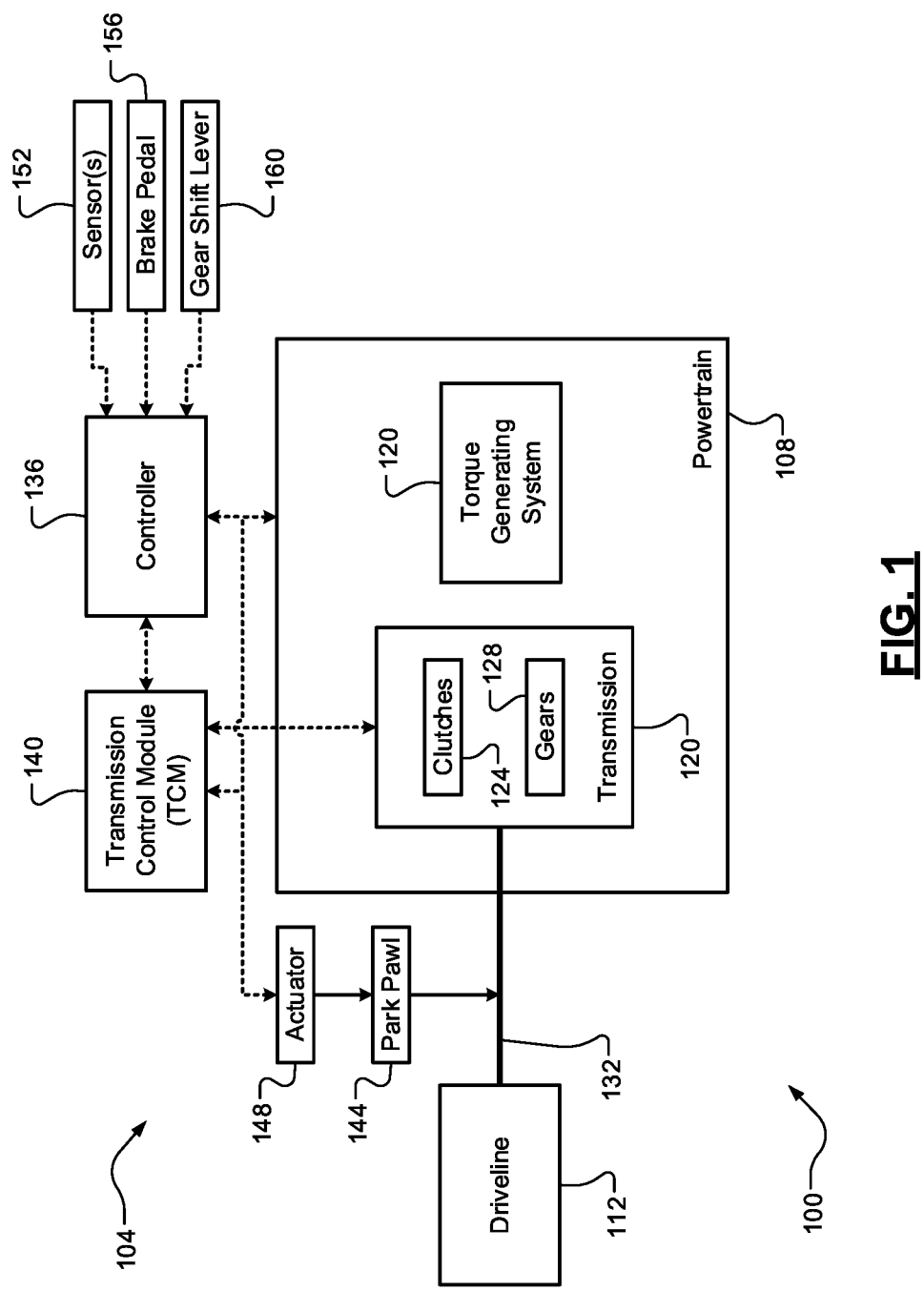
FIG. 1 is a functional block diagram of a vehicle having an example park control system configured for grade based transmission park pawl unloading according to the principles of the present application.

Referring now to FIG. 1, a functional block diagram of a vehicle 100 having an example park control system 104 configured for grade based transmission park pawl unloading according to the principles of the present application is illustrated. The vehicle 100 generally comprises a powertrain 108 that generates and transfers drive torque to a driveline 112 for vehicle propulsion. The powertrain 108 includes a torque generating system 116 (e.g., an internal combustion engine, an electric motor, or a combinations thereof) and an automatic transmission 120 (also referred to as "transmission 120").

The automatic transmission 120 generally comprises a plurality of clutches 124 and a plurality of gear ratios or gears 128. By activating a series of the plurality of clutches 124, the transmission 120 is able to cause drive torque to be transferred from the torque generating system 116 via one of the gears 128 and therethrough (i.e., to an output shaft 132 of the transmission 120). The driveline 112 includes any suitable driveline components, such as drive/half shafts or axles, a transfer case, a differential, and the like. A controller 136 is configured to control operation of the vehicle 100, although the transmission 120 may have its own designated transmission controller or transmission control module (TCM) 140.

The park control system 104 is configured to interact with the output shaft 132 of the transmission 120 to selectively lock up the transmission 120 in a park state to thereby inhibit or prevent vehicle movement. The park control system 104 includes a park pawl 144 that is controlled by an actuator 148 to selectively engage/disengage a park gear 128 or another notched wheel (not shown) of the transmission 120. It will be appreciated that the park pawl 144 and the actuator 148 could have other related or intermediary components that are not illustrated.

The park control system 104 also includes the controller 136 (or the TCM 140), which is configured to control the activation of a series of the clutches 124 of the transmission 120 based on a set of load parameters (e.g., from vehicle sensors 152) such as a current grade and weight of the vehicle 100. By actuating the series the clutches 124 of the transmission based on the set of load parameters, the controller 136 or the TCM 140 is able to cause the transmission 120 to generate a small amount of forward or reverse propulsion torque to unload the park pawl 144 such that the transmission 120 can be shifted out of park without the noticeable "bump" or NVH and without any intervention by the driver.

Figure 2:
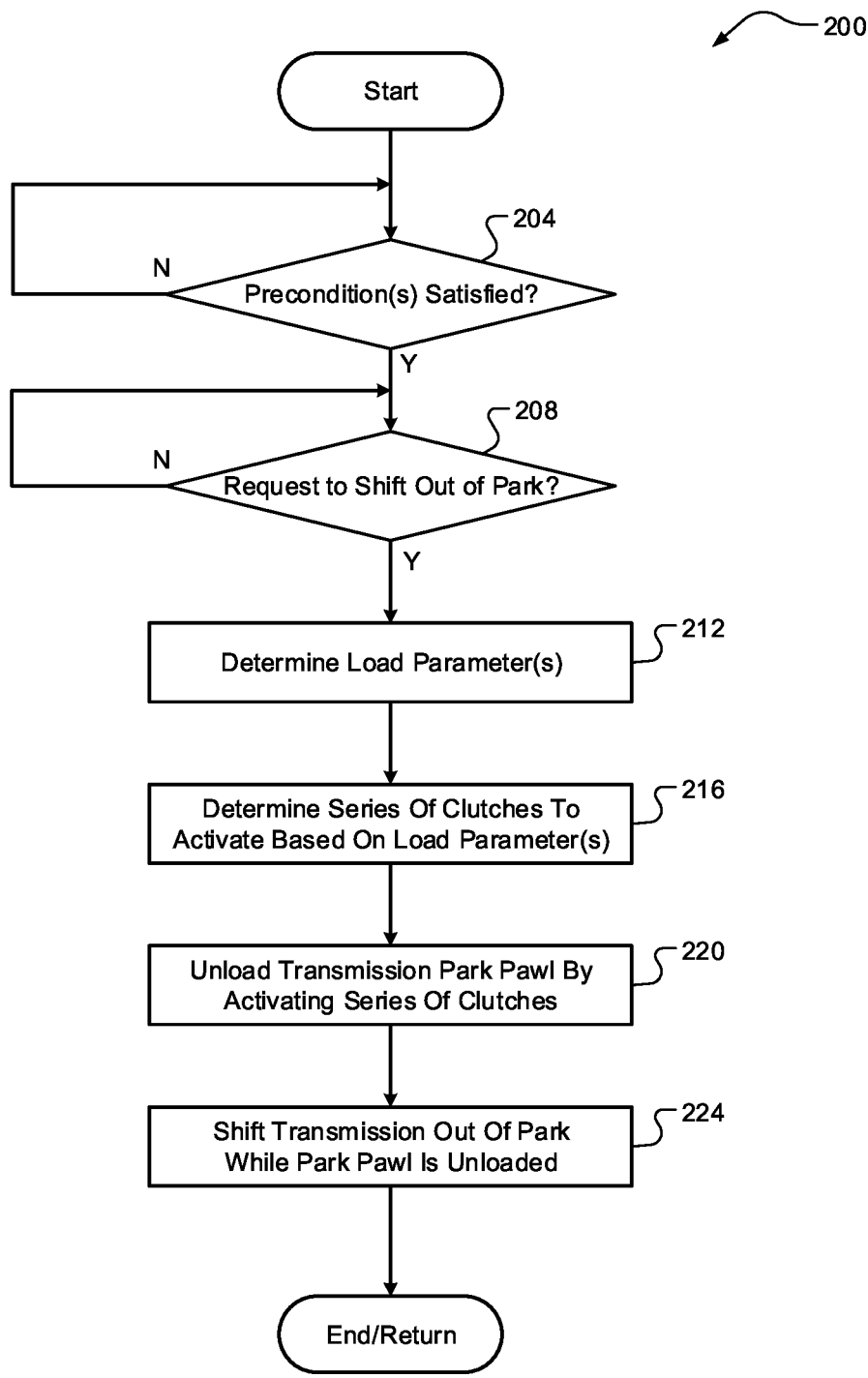
FIG. 2 is a flow diagram of an example grade based transmission park pawl unloading method for a vehicle according to the principles of the present application.

Referring now to FIG. 2, a flow diagram of an example grade based transmission park pawl unloading method 200 for a vehicle according to the principles of the present application is illustrated. While the method 200 specifically references the vehicle 100 and its components for illustrative/descriptive purposes, it will be appreciated that the method 200 could be applicable to any suitably configured vehicle. At 204, the controller 136 or TCM 140 determines whether an optional set of one or more preconditions are satisfied. These precondition(s) could include, for example, the vehicle 100 having being in the park state and there being no malfunctions present that would otherwise affect operation of the vehicle 100 or the park control system 104.

When false, the method 200 ends or returns to 204. When true, the method 200 continues to 208. At 208, the controller 136 or TCM 140 detects a request to shift the transmission 120 out of park. This could be detected, for example, based on driver input via a brake pedal 156 (e.g., fully-depressed) and a transmission shift lever 160 (e.g., moved out of park). When true, the method 200 continues to 212. When false, the method 200 returns to 208. At 212, the controller 136 or TCM 140 determines the set of load parameters, such as using the sensor(s) 152. The set of load parameters primarily include the current vehicle grade and weight, but it will be appreciated that the set of load parameters could include other parameters (e.g., clutch temperatures/pressures).

At 216, the controller 136 or TCM 140 determines, based on the set of load parameters, a series of the plurality of clutches 124 to activate such that the transmission 120 transfers or outputs a desired magnitude of drive torque in a desired direction (forward or backwards/reverse) at the driveline 112 to unload the park pawl 144. The specific series of clutches 124 will depend on the configuration of the transmission 120 and will be known to the controller 136 or the TCM 140. For example, the controller 136 or the TCM 140 knows the configuration of the transmission 120 such that it is able to activate a plurality of different series of the plurality of clutches 124 to cause the transmission 120 to transfer or output a plurality of different amounts of drive torque in both forward and reverse directions. In some implementations, the activation of at least some of the plurality of clutches 124 comprises only partial engagement of the clutches 124.

At 220, the controller 136 or the TCM 140 activates the series of clutches 124 as determined to unload the park pawl 144 from the transmission 120. Finally, at 224, the controller 136 or TCM 140 then disengages the park pawl 144 from the transmission 120 to complete the shift the transmission 120 out of park and into another desired gear (e.g., neutral or drive). As previously mentioned, the transmission clutch activation and torque transfer to unload the park pawl 144 occurs without any specific intervention by the driver and could be completely unnoticeable to the driver because there is no longer a "bump" or NVH when shifting the transmission out of park. The method 200 then ends or returns to 204 for one or more additional cycles.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A park control system for grade based transmission park pawl unloading of a vehicle, the park control system comprising:
    a set of sensors configured to monitor a set of load parameters of the vehicle, the set of load parameters including at least a grade of a surface that the vehicle is on and a weight of the vehicle; and
    a controller configured to:
        detect a request to shift a transmission of the vehicle out of a park state where a park pawl is engaged with an output shaft of the transmission to inhibit or prevent vehicle movement;
        in response to detecting the request, determine the set of load parameters using the set of sensors;
        based on the set of load parameters, activate a series of a plurality of clutches of the transmission to cause the transmission to transfer or output a desired amount of drive torque in a desired direction to unload the park pawl; and
        when the park pawl is unloaded, shift the transmission out of the park state without any noise/vibration/harshness (NVH) associated with a previous loading of the park pawl due to the surface grade and the vehicle weight.

2. The park control system of claim 1, wherein an electronic park brake is not utilized when shifting the transmission into the park state on the graded surface.

3. The park control system of claim 2, wherein the electronic park brake is not utilized when unloading the park pawl and shifting the transmission out of the park state.

4. The park control system of claim 1, wherein the controller is a transmission control module (TCM) configured for dedicated control of the transmission.

5. The park control system of claim 1, wherein the transmission is a multi-speed automatic transmission comprising the plurality of clutches and a plurality of gears.

6. The park control system of claim 5, wherein the controller knows the configuration of the transmission such that it is able to activate a plurality of different series of the plurality of clutches to cause the transmission to transfer or output a plurality of different amounts of drive torque in both forward and reverse directions.

7. The park control system of claim 6, wherein the activation of at least some of the plurality of clutches comprises only partial engagement of the clutches.

8. A grade based transmission park pawl unloading method for a vehicle, the method comprising:
    detecting, by a controller, a request to shift a transmission of the vehicle out of a park state where a park pawl is engaged with an output shaft of the transmission to inhibit or prevent vehicle movement;
    in response to detecting the request, determining, by the controller, a set of load parameters using a set of sensors configured to monitor the set of load parameters of the vehicle, the set of load parameters including at least a grade of a surface that the vehicle is on and a weight of the vehicle;
    based on the set of load parameters, activating, by the controller, a series of a plurality of clutches of the transmission to cause the transmission to transfer or output a desired amount of drive torque in a desired direction to unload the park pawl; and
    when the park pawl is unloaded, shifting, by the controller, the transmission out of the park state without any noise/vibration/harshness (NVH) associated with a previous loading of the park pawl due to the surface grade and the vehicle weight.

9. The method of claim 8, wherein an electronic park brake is not utilized when shifting the transmission into the park state on the graded surface.

10. The method of claim 9, wherein the electronic park brake is not utilized when unloading the park pawl and shifting the transmission out of the park state.

11. The method of claim 8, wherein the controller is a transmission control module (TCM) configured for dedicated control of the transmission.

12. The method of claim 8, wherein the transmission is a multi-speed automatic transmission comprising the plurality of clutches and a plurality of gears.

13. The method of claim 12, wherein the controller knows the configuration of the transmission such that it is able to activate a plurality of different series of the plurality of clutches to cause the transmission to transfer or output a plurality of different amounts of drive torque in both forward and reverse directions.

14. The method of claim 13, wherein the activation of at least some of the plurality of clutches comprises only partial engagement of the clutches.

* * * * *